(12) United States Patent
Marić et al.

(10) Patent No.: US 11,327,316 B2
(45) Date of Patent: May 10, 2022

(54) PARTICLE CONTROL FOR HEAD-MOUNT ABLE DEVICE

(71) Applicant: Apple Inc., Cupertino, CA (US)

(72) Inventors: Ivan S. Marić, Sunnyvale, CA (US); Devin M. Zettler, Santa Clara, CA (US); Jan K. Quijalvo, Mississauga (CA); David S. Gragnolati, San Francisco, CA (US); Jia Tao, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/942,624

(22) Filed: Jul. 29, 2020

(65) Prior Publication Data

US 2021/0055559 A1     Feb. 25, 2021

Related U.S. Application Data

(60) Provisional application No. 62/889,474, filed on Aug. 20, 2019.

(51) Int. Cl.
*G02B 27/01*     (2006.01)
*B08B 7/02*      (2006.01)

(52) U.S. Cl.
CPC ..... *G02B 27/0172* (2013.01); *G02B 27/0176* (2013.01); *G02B 2027/0178* (2013.01)

(58) Field of Classification Search
USPC .......................................................... 345/8
See application file for complete search history.

(56) References Cited

U.S. PATENT DOCUMENTS

| | | | |
|---|---|---|---|
| 8,305,296 B2 | 11/2012 | Iba et al. | |
| 9,250,444 B2 | 2/2016 | Magyari | |
| 10,078,223 B2 | 9/2018 | Magyari | |
| 10,551,920 B2 | 2/2020 | Joo | |
| 2012/0057066 A1* | 3/2012 | Kawai | H04N 5/22521 348/340 |
| 2013/0083009 A1* | 4/2013 | Geisner | A63F 13/816 345/419 |
| 2013/0276627 A1* | 10/2013 | Luo | H04N 5/2171 95/1 |

(Continued)

FOREIGN PATENT DOCUMENTS

| CN | 107199948 A | 9/2017 |
|---|---|---|
| CN | 207216155 U | 4/2018 |

OTHER PUBLICATIONS

Chinese Office Action from Chinese Patent Application No. 2020108264982, dated Feb. 9, 2022, 17 pages including machine-generated English language translation.

*Primary Examiner* — Chineyere D Wills-Burns
(74) *Attorney, Agent, or Firm* — BakerHostetler

(57) ABSTRACT

A head-mountable device can provide an optical module that removes particles from an optical pathway and captures the particles so they do not interfere with the user's view of and/or through optical elements. For example, the display element and/or another optical element can be moved in a manner that releases particles on a viewing surface thereof. The optical module can include a particle retention element that securely retains the particles so that they remain outside of the optical pathway. Such particle removal and retention can improve and maintain the quality of a user's visual experience via the optical module.

19 Claims, 4 Drawing Sheets

(56) References Cited

U.S. PATENT DOCUMENTS

| | | | |
|---|---|---|---|
| 2014/0266986 A1* | 9/2014 | Magyari | G02B 27/0176 345/8 |
| 2015/0044662 A1* | 2/2015 | Goto | G06F 3/016 434/365 |
| 2015/0192777 A1* | 7/2015 | Bae | G06F 3/013 359/245 |
| 2015/0198807 A1* | 7/2015 | Hirai | G02B 27/017 345/8 |
| 2015/0268721 A1* | 9/2015 | Joo | G02B 27/017 345/156 |
| 2016/0018655 A1* | 1/2016 | Imoto | G06F 3/013 345/8 |
| 2018/0039052 A1* | 2/2018 | Khan | G02B 17/0856 |
| 2018/0217637 A1* | 8/2018 | Zou | G06T 19/006 |
| 2018/0244204 A1* | 8/2018 | Boehm | B60S 1/026 |

\* cited by examiner

PARTICLE CONTROL FOR HEAD-MOUNTABLE DEVICE

CROSS-REFERENCE TO RELATED APPLICATION

This application claims the benefit of U.S. Provisional Application No. 62/889,474, entitled "PARTICLE CONTROL FOR HEAD-MOUNTABLE DEVICE," filed Aug. 20, 2019, the entirety of which is incorporated herein by reference.

TECHNICAL FIELD

The present description relates generally to head-mountable devices, and, more particularly, to particle control for head-mountable devices.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
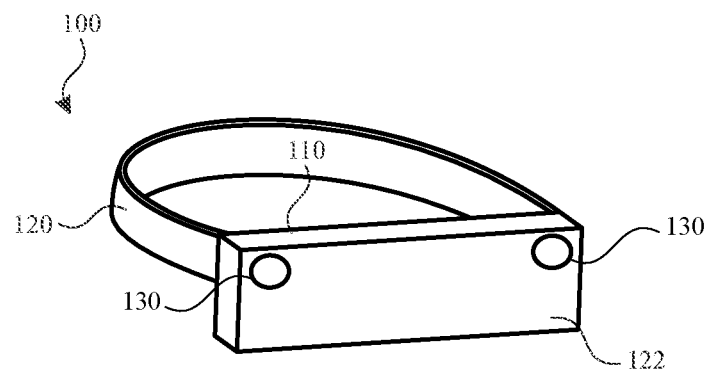
FIG. 1 illustrates a perspective view of a head-mountable device on a user, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device. The head-mountable device can provide a user experience that is immersive or otherwise natural so the user can easily focus on enjoying the experience without being distracted by the mechanisms of the head-mountable device.

Components of a head-mountable device can include one or more optical modules that provide images and/or views (e.g., to an external environment). Such optical modules can include a display element and/or optical elements that enhance a user's view. The quality of the view provided by the optical module can be dependent on the clarity of the optical pathway between the source of the image and the eye of the user. For example, particles (e.g., dust, debris, foreign object, and/or other materials) along the optical pathway can obstruct, distort, and/or otherwise adversely affect the view provided to the user. In particular, where a display element includes a high-resolution display, such particles on a surface of the display element can block entire pixels and/or multiple pixels, such that the image transmitted to the user is altered from its intended form.

Particles can collect along the optical pathway during the lifespan of the head-mountable device. An optical module can be sealed to prevent and/or limit ingress of substantially all particles from an external environment. However, even when an internal chamber of an optical module is sealed, particles can migrate from within the chamber due to degradation, erosion, friction, wear, and/or aging of components. When such particles are generated and/or released, they may collect on the display element and/or another optical element along the optical pathway.

Systems of the present disclosure can provide a head-mountable device with an optical module that removes particles from an optical pathway and captures the particles so they do not interfere with the user's view of and/or through optical elements. For example, the display element and/or another optical element can be moved in a manner that releases particles on a viewing surface thereof. The optical module can include a particle retention element that securely retains the particles so that they remain outside of the optical pathway. The movement of the display element and/or another optical element can be performed periodically, based on user input, based on conditions detected by an internal sensor, and/or based on conditions detected by an external device. The movement of the display element and/or another optical element can be achieved with one or more actuators in one or more of a variety of movement patterns to release the particles. Such particle removal and retention can improve and maintain the quality of a user's visual experience via the optical module.

These and other embodiments are discussed below with reference to FIGS. 1-7. However, those skilled in the art will readily appreciate that the detailed description given herein with respect to these Figures is for explanatory purposes only and should not be construed as limiting.

According to some embodiments, for example as shown in FIG. 1, a head-mountable device 100 includes a frame 110 that is worn on a head of a user. The frame 110 can be positioned in front of the eyes of a user to provide information within a field of view of the user. The frame 110 can provide nose pads or another feature to rest on a user's nose. The frame 110 can be supported on a user's head with the securement element 120. The securement element 120 can wrap or extend along opposing sides of a user's head. The securement element 120 can include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the securement element 120 can include multiple components to engage a user's head.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 100, as discussed further herein. Any number of components can be included within and/or on the frame 110 and/or the securement element 120.

The frame 110 can include and/or support one or more camera modules 130. The camera modules 130 can be positioned on or near an outer side 122 of the frame 110 to capture images of views external to the head-mountable device 100. As used herein, an outer side of a portion of a head-mountable device is a side that faces away from the user and/or towards an external environment. The captured images can be used for display to the user or stored for any other purpose.

Figure 2:
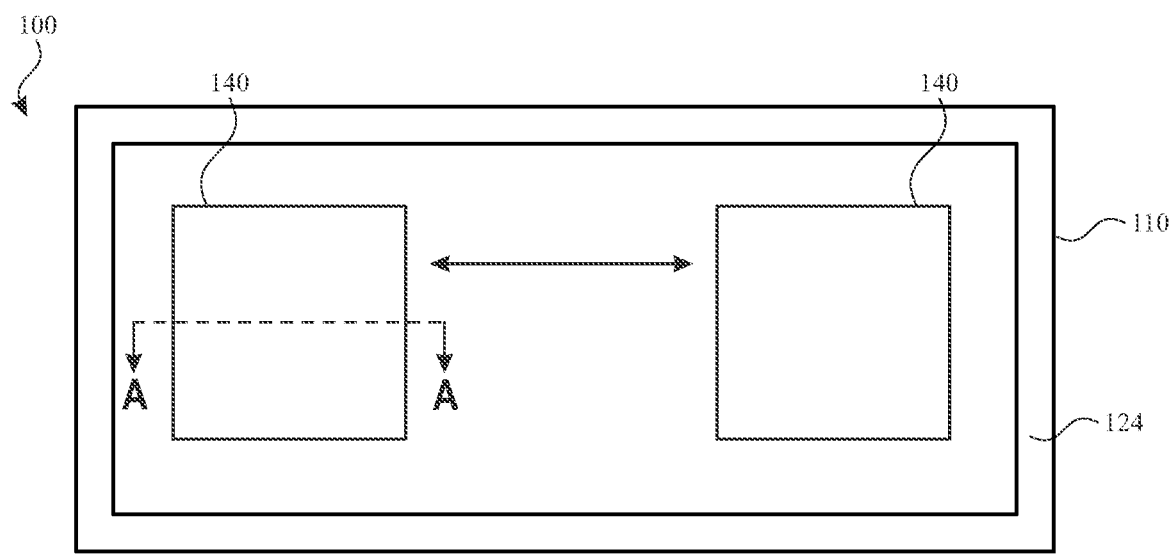
FIG. 2 illustrates a rear view of a head-mountable device, according to some embodiments of the present disclosure.

Referring now to FIG. 2, a head-mountable device can be provided with optical modules that provide visual output for viewing by a user wearing the head-mountable device. As shown in FIG. 2, one or more optical modules 140 can be positioned on an inner side 124 of the frame 110. As used herein, an inner side of a portion of a head-mountable device is a side that faces toward the user and/or away from the external environment. For example, a pair of optical modules 140 can be provided, where each optical module 140 is movably positioned to be within the field of view of each of a user's two eyes. Each optical module 140 can be adjusted to align with a corresponding eye of the user. For example, each optical module 140 can be moved along one or more axes until a center of each optical module 140 is aligned with a center of the corresponding eye. Accordingly, the distance between the optical modules 140 can be set based on an interpupillary distance of the user. Movement of the optical modules 140 can be achieved by mechanisms described further herein.

Movement of each of the optical modules can match movement of a corresponding camera module. For example, each optical module 140 can be supported on the inner side 124 of the frame 110, and a camera 130 can be coupled to and movable with a corresponding one of the optical modules 140. The optical module 140 can be adjusted to align with the corresponding eye of the user, and the camera 130 can be correspondingly adjusted so that the field of view provided by the optical module 140 corresponds to a field of view captured by the camera 130. Accordingly, the optical module 140 is able to accurately reproduce, simulate, or augment a view based on a view captured by the camera 130 with an alignment that corresponds to the view that the user would have naturally without the head-mountable device 100.

An optical module 140 can transmit light from a physical environment (e.g., as captured by a camera module) for viewing by the user. Such an optical module 140 can include optical properties, such as lenses for vision correction based on incoming light from the physical environment. Additionally or alternatively, an optical module 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 3:
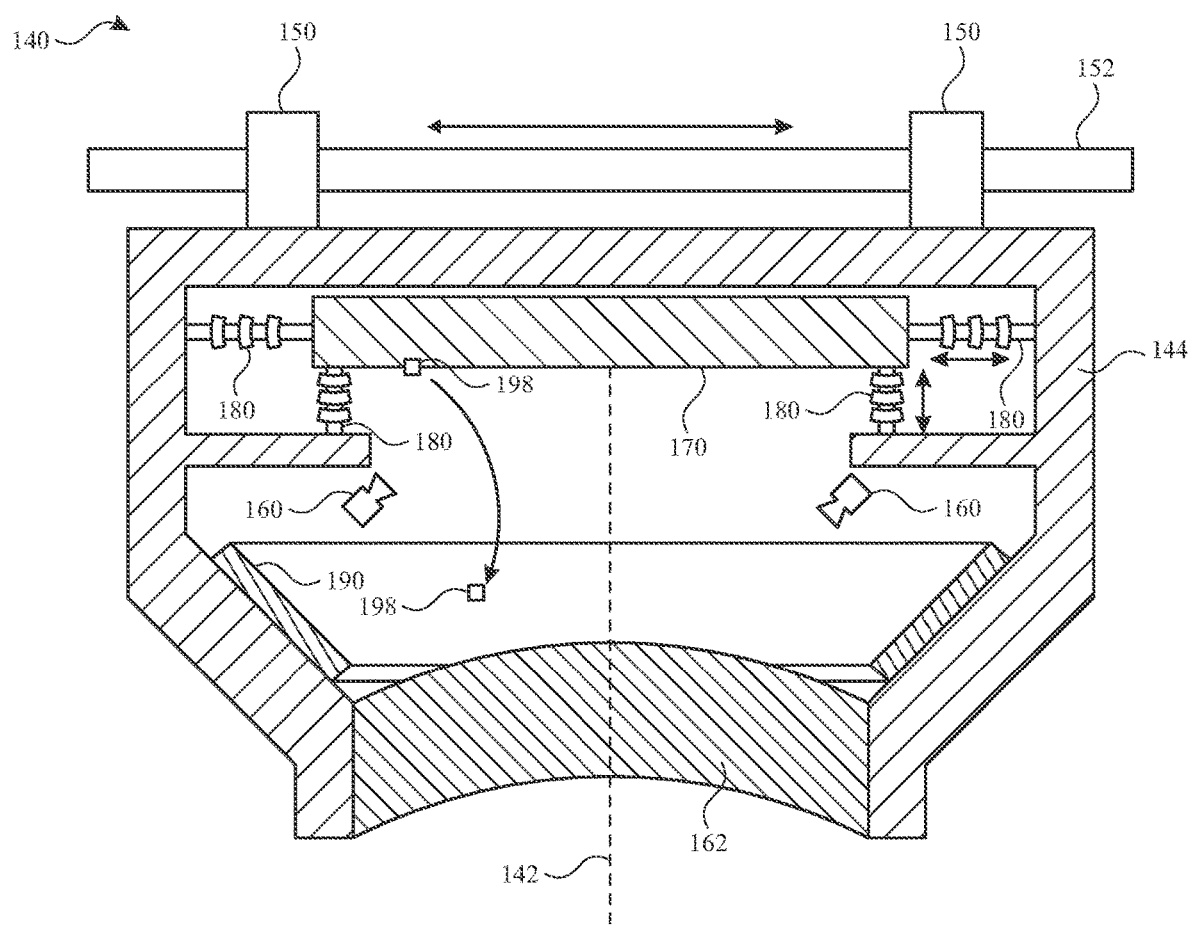
FIG. 3 illustrates a sectional view of an optical module of the head-mountable device of FIG. 2 taken along line A-A, according to some embodiments of the present disclosure.

Referring now to FIG. 3, an optical module can provide visual output for viewing by a user. While a single optical module 140 as shown in FIG. 3, it will be understood that separate optical modules can be provided for each of the user's two eyes. Each of the optical modules 140 can be adjusted to align with the corresponding eye of the user. For example, one or more module actuators 150 can be provided to move the optical module 140 relative to the frame of the head-mountable device. By further example, each optical module 140 can move along a rail 152. While the optical module 140 is shown with its own module actuators 150, it will be understood that a single module actuator or set of module actuators can be provided to simultaneously move separate optical modules 140 (e.g., along the rail 152).

The optical module 140 can include a housing 144 that encloses individual components of the optical module 140. The housing 144 can support an optical element 162 that provides a view to an interior portion of the housing 144 (e.g., to a display element within the housing 144). While the optical element 162 is shown as a lens in FIG. 3, it will be understood that the optical element 162 can include or be provided with one or more diffusers, filters, polarizers, prisms, beam splitters, diffraction gratings, mirrors, and/or windows. The housing 144 and the optical element 162 can together define an outer periphery of the optical module 140 and sealingly enclose the interior thereof. For example, an interior space of the optical module 140 can be isolated (e.g., hermetically sealed) from an external environment, such that ingress and/or egress of particles is limited or prevented. Such sealing can be achieved during assembly of the optical module 140 and optionally restored after assembly (e.g., during a maintenance operation).

The optical module 140 can be operated for displaying visual information for a user. The optical module 140 can provide visual (e.g., image or video) output. The optical module 140 can include a display element 170, such as an opaque, transparent, and/or translucent display screen. The display element 170 can emit light. Additionally or alternatively, the display element 170 can have a transparent or translucent medium through which light representative of images is directed to a user's eyes. The display element 170 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The optical module 140 can include the optical element 162 configured to help optically adjust and correctly project the image-based content being displayed by the display element 170 for close-up viewing. The display element 170 and/or the optical element 162 can be positioned along an optical pathway 142 along which a user may be provided with a view of the visual information output by the display element 170. For example, the optical pathway 142 can be defined as a pathway along which light travels from the display element 170, through the optical element 162, and to the user's eye. While the optical pathway 142 is shown in FIG. 3 as a line or axis, it will be understood that the optical pathway 142 can include all pathways and regions along which light can travel from the display element 170 to the user's eye. Such an optical pathway 142 can include pathways through the optical element 162 and/or any other optical element or combination of optical elements.

While the optical module 140 can be sealed to isolate internal components from an external environment, it will be understood that particles may nonetheless be generated from within the housing 144 during use and/or aging of the optical module 140. For example, even when an internal chamber of an optical module is sealed, particles can migrate within the chamber from degradation, erosion, friction, wear, and/or aging of components, including components that define the chamber itself. When such particles are generated and/or released, they may collect on the display element 170 and/or another optical element 162 along the optical pathway 142.

One or more actuators can be provided to move the entire optical module 140 in a manner that releases particles that have collected on optical components thereof. As shown in FIG. 3, one or more module actuators 150 can be provided to move the optical module 140 relative to a frame of the head-mountable device (e.g., along the rail 152). As discussed herein, the one or more module actuators 150 can be operated to move a single optical module 140 and/or multiple optical modules 140 (e.g., to accommodate a user's interpupillary distance). The module actuator 150 can be coupled to the housing 144 of the optical module 140 to support and/or move the housing 144 as well as the components contained therein. The module actuators 150 can include or be connected to motors, hydraulic actuators, pneumatic actuators, magnetic actuators, piezoelectric actuators, electroactive materials, stepper motors, shape-memory alloys, and the like, as well as drivetrain components such as gears, clutches, and/or transmissions, to facilitate independent or simultaneous movement of components based on operation of corresponding actuators.

It will be understood that the module actuator 150 can move the optical module 140 in any of one or more directions. For example, the module actuator 150 can move the optical module 140 along the rail 152 and/or relative to the frame of the head-mountable device. While the module actuator 150 can move the optical module 140 for certain purposes (e.g., to align with a user's eye), the same module actuator 150 can be operated to dislodge particles 198 from the display element 170, the optical element 162, and/or any other component of the optical module 140. By moving the optical module 140 with the module actuator 150, the components of the optical module 140 can be moved relative to the particles 198 resting thereon. Due to the inertia of the particles 198, as forces are applied (e.g., via the module actuator 150) to the display element 170, the optical element 162, and/or any other component of the optical module 140, the particles 198 can be separated from the surfaces on which they are resting.

The movement provided by the module actuator 150 can facilitate separation of the particles 198 from the components of the optical module 140. For example, the module actuator 150 can be operated to vibrate the optical module 140 in one or more oscillatory patterns. Such vibrations can be achieved with oscillatory patterns that include high frequency, low amplitude oscillations and/or low frequency, high amplitude oscillations. Additionally or alternatively, the module actuator 150 can be operated to move the optical module 140 with sudden motions with rapid acceleration to effectively dislodge the particles 198. Movements provided by the module actuator 150 can be translational. For example, the module actuator 150 can move the optical module 140 along an axis (e.g., defined by the rail 152) and/or a curved pathway. By further example, the module actuator 150 can move the optical module 140 in a direction that is transverse to the optical pathway 142 to provide shear forces to the particles 198 and/or along the optical pathway 142 to eject the particles 198. Additionally or alternatively, movements provided by the module actuator 150 can be rotational. For example, the module actuator 150 can rotate the optical module 140 about an axis that extends through the optical module 140 and/or outside the optical module 140. By further example, the module actuator 150 can rotate the optical module 140 about the optical pathway 142.

One or more actuators can be provided to move individual components of the optical module 140 in a manner that releases particles that have collected on optical components thereof. As shown in FIG. 3, one or more display actuators 180 can be provided to move the display element 170 relative to the housing 144 of the optical module 140. The display actuators 180 can be coupled to the housing 144 and the display element 170 to alter distance there between at one or more locations. The display actuators 180 can include or be connected to motors, hydraulic actuators, pneumatic actuators, magnetic actuators, piezoelectric actuators, electroactive materials, stepper motors, shape-memory alloys, and the like, as well as drivetrain components such as gears, clutches, and/or transmissions, to facilitate independent or simultaneous movement of components based on operation of corresponding actuators.

It will be understood that the display actuators 180 can move the display element 170 in any of one or more directions. For example, the display actuators 180 can move the display element 170 relative to the housing 144 of the optical module 140. The display actuators 180 can be operated to dislodge particles 198 from the display element 170. By moving the display element 170 with the display actuators 180, the components of the display element 170 can be moved relative to the particles 198 resting thereon. Due to the inertia of the particles 198, as forces are applied (e.g., via the display actuators 180) to the display element 170, the particles 198 can be separated from the surfaces on which they are resting.

The movement provided by the display actuators 180 can facilitate separation of the particles 198 from the display element 170. For example, the display actuators 180 can be operated to vibrate the display element 170 in one or more oscillatory patterns. Such vibrations can be achieved with oscillatory patterns that include high frequency, low amplitude oscillations and/or low frequency, high amplitude oscillations. Additionally or alternatively, the display actuators 180 can be operated to move the display element 170 with sudden motions with rapid acceleration to effectively dislodge the particles 198. Movements provided by the display actuators 180 can be translational. For example, the display actuators 180 can move the display element 170 along an axis (e.g., defined by the rail 152) and/or a curved pathway. By further example, the display actuators 180 can move the display element 170 in a direction that is transverse to the optical pathway 142 to provide shear forces to the particles 198 and/or along the optical pathway 142 to eject the particles 198. Additionally or alternatively, movements provided by the display actuators 180 can be rotational. For example, the display actuators 180 can rotate the display element 170 about an axis that extends through the display element 170 and/or outside the display element 170. By further example, the display actuators 180 can rotate the display element 170 about the optical pathway 142.

It will be understood that other mechanisms for dislodging particles are contemplated for the head-mountable device described herein. For example, the optical module can include one or more blowers (not shown) that direct air or another fluid within, against, or across the optical module 140 and/or one or more components of the optical module 140. As used herein, a blower can include any mechanism that provides mechanical movement of a fluid (e.g., gas or liquid). Examples include pumps, turbines, compressors, fans, and piezo air movers.

Once the particles are dislodged, they can be retained at a location that does not interfere with the user's view along the optical pathway. The optical module 140 can include one or more particle retention elements 190 within the housing 144. A particle retention element 190 can provide a surface that retains a particle 198 upon contact of the particle 198 with the particle retention element 190. For example, the particle retention element 190 can include an adhesive (e.g., pressure-sensitive adhesive), polymer, glue, cement, paste, laminate, and/or other material that bonds to particles 198 upon contact with the particle retention element 190. By further example, the particle retention element 190 can include an uncured or partially cured substance that is exposed to the interior of the housing 144. Additionally or alternatively, the particle retention element 190 can include an operable electrode or other surface that is configured to electrically charged to attract the particles 198. Additionally or alternatively, the particle retention element 190 can include a filter and/or a mechanically actuatable container for selectively containing particles that migrate therein.

The particle retention element 190 can be positioned within the housing 144, such that it is exposed to the same interior chamber that contains at least part of the display element 170 and/or the optical element 162. By further example, the particle retention element 190 can be positioned axially between the display element 170 and the user's eye (e.g., between the display element 170 and the optical element 162). Despite the axial location described herein, the particle retention element 190 can be positioned radially outside and optical pathway 142, such that the particle retention element 190 does not obstruct a user's view of the display element 170. For example, the particle retention element 190 can extend (e.g., annularly) entirely or partially about the optical pathway 142. While the particle retention element 190 is shown a distance away from the optical element 162 and the display element 170, it will be understood that a particle retention element 190, or a portion thereof, can extend onto the optical element 162 and/or the display element 170. For example, portions of the optical element 162 and/or the display element 170 can be outside the optical pathway 142, and such portions can be covered and/or coated with at least a portion of a particle retention element 190. By further example, portions of the particle retention element 190 can provide structural support to the optical element 162 and/or the display element 170 by coupling the housing 144 to the corresponding component (e.g., the optical element 162 and/or the display element 170).

As further shown in FIG. 3, the optical module 140 can include one or more particle sensors 160 that are configured to detect the presence of the particles 198 on the display element 170, the optical element 162, and/or any other component of the optical module 140. Operation of the actuators and/or other mechanisms can be based on the detections made by the particle sensors 160.

For example, a particle sensor 160 (e.g., camera) can be oriented so that it is directed toward the display element 170. The particle sensor 160 can be operated to optically detect the presence of a particle 198 within a field-of-view of the particle sensor 160 and on a surface of the display element 170. Such a detection can be facilitated by coordinating with the display element 170 to display a known image, wherein optically detect deviations from the known image can indicate the presence of a particle obstructing the output of the image.

By further example, a particle sensor 160 (e.g., camera) can be oriented so that it is directed toward the optical element 162. The particle sensor 160 can be operated to optically detect the presence of a particle 198 within a field-of-view of the particle sensor 160 and on a surface of the optical element 162. Such a particle sensor 160 can optionally be operated to capture a view of a user's eye to determine the direction of the user's gaze, as discussed further herein. As such, the particle sensor 160 can be operated in different modes at different times and/or simultaneously. While the particle sensor 160 may have a first set of operating parameters for eye detection (e.g., far focal distance, near infrared spectrum), the particle sensor 160 can have a second set of operating parameters for particle detection (e.g., near focal distance, visible spectrum).

While the depicted particle sensors 160 are shown as being positioned within the housing 144, it will be understood that one or more particle sensors can be positioned outside of the housing 144 to capture a view of the optical element 162 and/or the display element 170. For example, a particle sensor 160 can be positioned outside the housing 144 and otherwise coupled to the optical module 140. The particle sensor 160 can capture a view of the optical element 162 and/or the display element 170 (e.g., through the optical element 162) to detect the presence of particles 198 thereon.

Additionally or alternatively, particles can be detected by one or more other mechanisms. For example, the presence of particles can be detected based on the mass, change of mass, and/or distribution of mass of the optical module 140. By further example, the presence of particles can be detected chemically by sampling surfaces of components of the optical module 140. It will be understood that particle mitigation techniques can be implemented without prior detection of particles, as discussed further herein.

Figure 4:
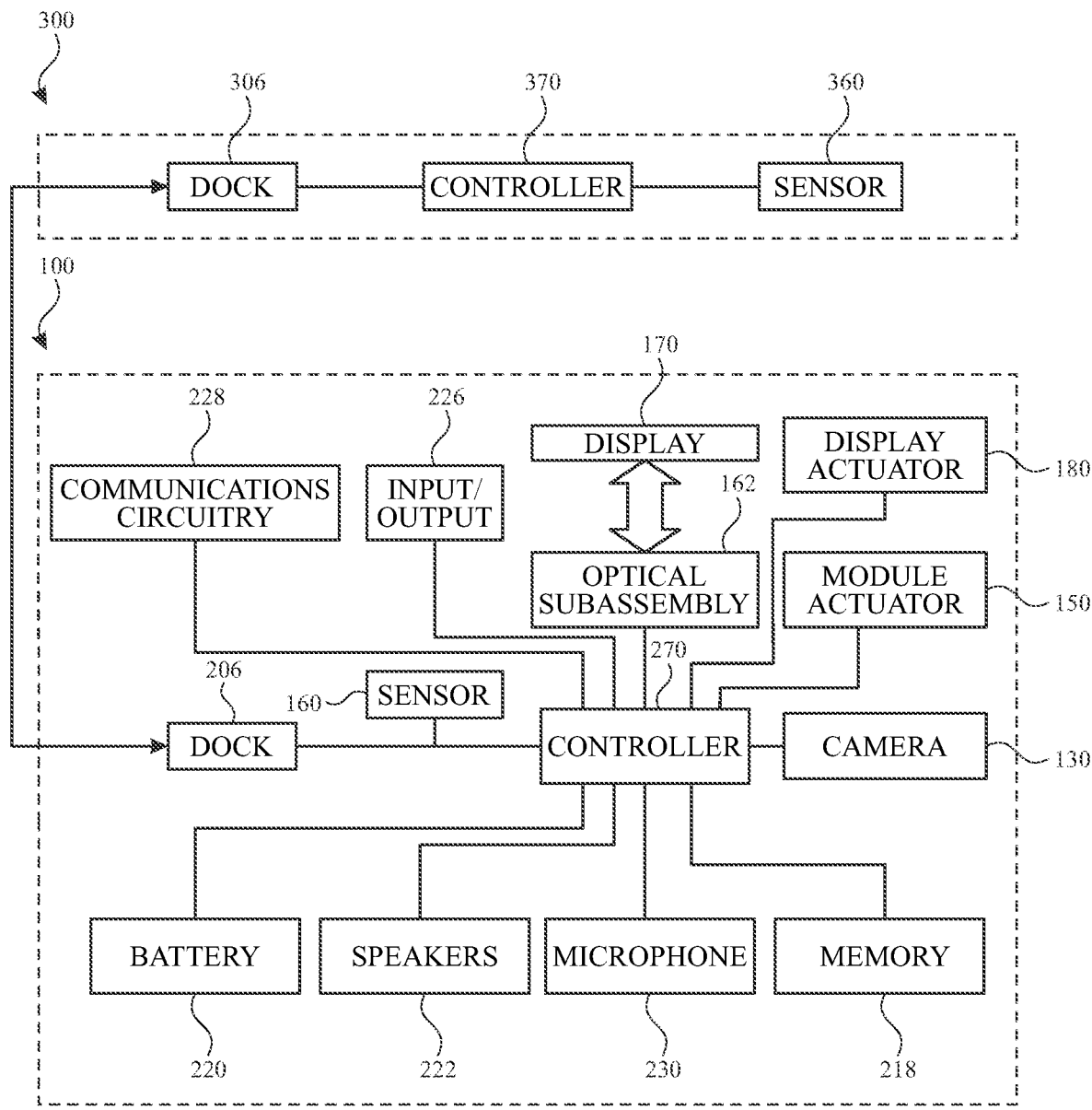
FIG. 4 illustrates a block diagram of a head-mountable device, in accordance with some embodiments of the present disclosure.

Referring now to FIG. 4, components of the head-mountable device can be operably connected to provide the performance described herein. FIG. 4 shows a simplified block diagram of an illustrative head-mountable device 100 in accordance with one embodiment of the invention. It will be appreciated that components described herein can be provided on either or both of a frame and/or a securement element of the head-mountable device 100.

As shown in FIG. 4, the head-mountable device 100 can include a controller 270 with one or more processing units that include or are configured to access a memory 218 having instructions stored thereon. The instructions or computer programs may be configured to perform one or more of the operations or functions described with respect to the head-mountable device 100. The controller 270 can be implemented as any electronic device capable of processing, receiving, or transmitting data or instructions. For example, the controller 270 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 218 can store electronic data that can be used by the head-mountable device 100. For example, the memory 218 can store electrical data or content such as, for example, audio and video files, documents and applications, device settings and user preferences, timing and control signals or data for the various modules, data structures or databases, and so on. The memory 218 can be configured as any type of memory. By way of example only, the memory 218 can be implemented as random access memory, read-only memory, Flash memory, removable memory, or other types of storage elements, or combinations of such devices.

The head-mountable device 100 can further include an optical module for displaying visual information for a user, including the display element 170 and/or an optical subassembly (e.g., the optical element 162), as discussed herein. The head-mountable device 100 can further include the module actuator 150 and the display actuator 180, as discussed herein. The head-mountable device 100 can further include the one or more particle sensors 160, as discussed herein. The particle sensor 160 can include an optical sensor, such as a photodiode or a photodiode array. Additionally or alternatively, the particle sensor 160 can include one or more of various types of optical sensors that are arranged in various configurations for optically detecting particles. The particle sensor 160 can include an image sensor formed from a charge-coupled device (CCD) and/or a complementary metal-oxide-semiconductor (CMOS) device, a photovoltaic cell, a photo resistive component, a laser scanner, and the like.

The head-mountable device 100 can include the camera 130 for capturing a view of an environment external to the head-mountable device 100. The camera 130 can include an optical sensor, such as a photodiode or a photodiode array. Additionally or alternatively, the camera 130 can include one or more of various types of optical sensors that are arranged in various configurations for detecting user inputs described herein. The camera 130 may be configured to capture an image of a scene or subject located within a field of view of the camera 130. The image may be stored in a digital file in accordance with any one of a number of digital formats. In some embodiments, the head-mountable device 100 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The head-mountable device 100 can include a battery 220, which can charge and/or power components of the head-mountable device 100.

The head-mountable device 100 can include an input/output component 226, which can include any suitable component for connecting head-mountable device 100 to other devices. Suitable components can include, for example, audio/video jacks, data connectors, and/or any additional or alternative input/output components.

The head-mountable device 100 can include communications circuitry 228 for communicating with one or more servers or other devices using any suitable communications protocol. For example, the communications circuitry 228 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. The communications circuitry 228 can also include an antenna for transmitting and receiving electromagnetic signals.

The head-mountable device 100 can include a microphone 230. The microphone 230 can be operably connected to the controller 270 for receiving audio input, including voice commands from the user.

The head-mountable device 100 can include speakers 222. The speakers 222 can be operably connected to the controller 270 for control of speaker output, including sound levels.

The head-mountable device 100 can include a dock 206 operative to connect to an external device 300 via a dock 306 thereof. The dock 206 can include a connector (e.g., Lightning, USB, FireWire, power, DVI, etc.), which can be plugged into a complementary connector of the external device 300. The dock 206 may include features for helping to align the connectors during engagement and for physically coupling the head-mountable device 100 to the external device 300. The external device 300 can provide charging, diagnostics, and/or communications connectivity to the head-mountable device 100. In some embodiments, the external device 300 can include a particle sensor 360 that can operate in a manner similar to the particle sensor 160. For example, when the head-mountable device 100 is coupled to the external device 300, the particle sensor 360 can be positioned outside the optical module to capture a view of the optical element 162 and/or the display element 170 (e.g., through the optical element 162) to detect the presence of particles 198 thereon. Detections can be communicated to the head-mountable device 100 (e.g., via the dock 306 and the dock 206), and operation of the actuators and/or other mechanisms can be based on the detections made by the particle sensor 360.

The head-mountable device 100 can optionally connect to a portable electronic device, which can provide certain functions. The portable electronic device can provide a handheld form factor (e.g., small portable electronic device which is light weight, fits in a pocket, etc.). Although not limited to these, examples include media players, phones (including smart phones), PDAs, watches, computers, and the like. The portable electronic device may include a screen for presenting the graphical portion of the media to the user. The portable electronic device can provide processing capabilities by communicating with the controller 270 of the head-mountable device 100. The portable electronic device can provide actuation to dislodge particles from components of the head-mountable device 100 by operating a haptic feedback element of the portable electronic device.

The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc.

Figure 5:
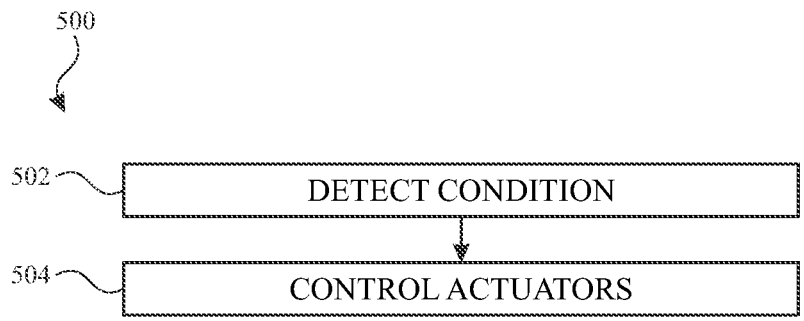
FIG. 5 illustrates a method of operating a head-mountable device to capture particles within an optical module, in accordance with some embodiments of the present disclosure.

Referring now to FIG. 5, a method of operating a head-mountable device is provided to achieve the results described herein. The method 500 can be performed at least in part by a head-mountable device to dislodge particles (e.g., dust) from optical components and retain the particles outside of an optical pathway. Additionally or alternatively, at least some steps can be performed in part by another device operatively connected to the head-mountable device. It will be understood that the method 500 illustrated in FIG. 5 is merely an example, and that a method can be performed with additional steps and/or fewer steps than those illustrated in FIG. 5.

In operation 502, a head-mountable device detects one or more conditions indicating that a particle control step is appropriate. The condition can be one or more of a variety of conditions. For example, one or more sensors of the head-mountable device can detect a presence of a particle on one or more optical components of the optical module and/or along an optical pathway and can further determine that a cleaning operation is to be performed under such a condition. By further example, the head-mountable device can receive a command from a user (e.g., from a user input component) to perform a cleaning operation. By further example, the head-mountable device can reference a predetermined schedule and/or period of time to determine that a cleaning operation is to be performed. By further example, the head-mountable device can determine that a procedure to boot up and/or boot down the head-mountable device has been initiated and further determine that a cleaning operation is to be performed before, during, and/or after such a procedure. By further example, the head-mountable device can determine that it is or is not being worn by a user and can further determine that a cleaning operation is to be performed under such a condition. By further example, the head-mountable device can determine that it is or is not coupled to an external device (e.g., charging station) and can further determine that a cleaning operation is to be performed under such a condition.

In operation 504, the head-mountable device initiates a cleaning procedure (e.g., with a processor) based on the detected condition. For example, the controller of the head-mountable device operates one or more actuators (e.g., module actuator and/or display actuator) to move the optical module and/or the display element to dislodge particles therefrom. Other operations can be similarly performed as described herein to dislodge particles. The particles can be captured (e.g., actively and/or passively) by one or more particle retention elements.

Figure 6:
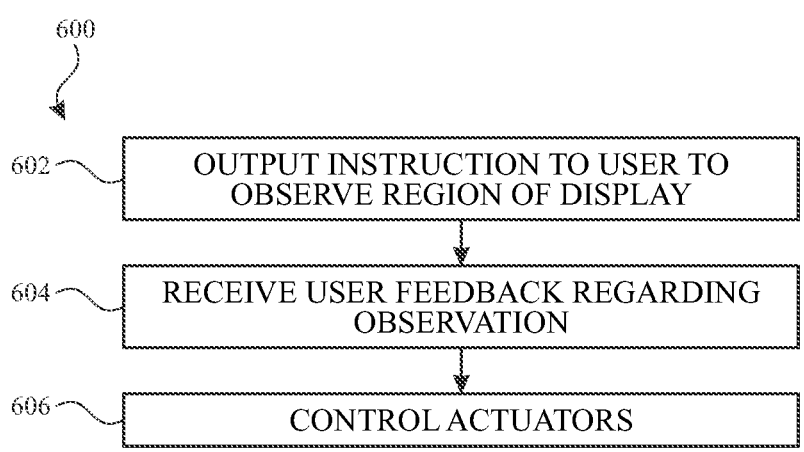
FIG. 6 illustrates a method of operating a head-mountable device to capture particles within an optical module, in accordance with some embodiments of the present disclosure.

Referring now to FIG. 6, another method of operating a head-mountable device is provided to achieve the results described herein. The method 600 can be performed at least in part by a head-mountable device to dislodge particles (e.g., dust) from optical components and retain the particles outside of an optical pathway. Additionally or alternatively, at least some steps can be performed in part by another device operatively connected to the head-mountable device. It will be understood that the method 600 illustrated in FIG. 6 is merely an example, and that a method can be performed with additional steps and/or fewer steps than those illustrated in FIG. 6.

In operation 602, a head-mountable device outputs instructions to a user to observe a region of the display element that appears, to the user, to have a visual defect. Such a defect can be understood to correspond to the presence of a particle on a surface of an optical component.

In operation 604, the head-mountable device can receive user feedback regarding the requested observation. For example, the one or more sensors can detect the direction of a user's gaze and calculate a corresponding location on the display element and/or other optical element to determine that the user is indicating the location of a particle obstructing a view along the optical pathway. By further example, the user feedback can be received via any input component, including tactile input, motion gesture control, and/or voice command. The user feedback can be subject to further verification by the head-mountable device, for example by mechanisms described further herein.

In operation 606, the head-mountable device initiates a cleaning procedure (e.g., with a processor) based on the user feedback. For example, the controller of the head-mountable device operates one or more actuators (e.g., module actuator and/or display actuator) to move the optical module and/or the display element to dislodge particles therefrom. Other operations can be similarly performed as described herein to dislodge particles. The particles can be captured (e.g., actively and/or passively) by one or more particle retention elements.

Figure 7:
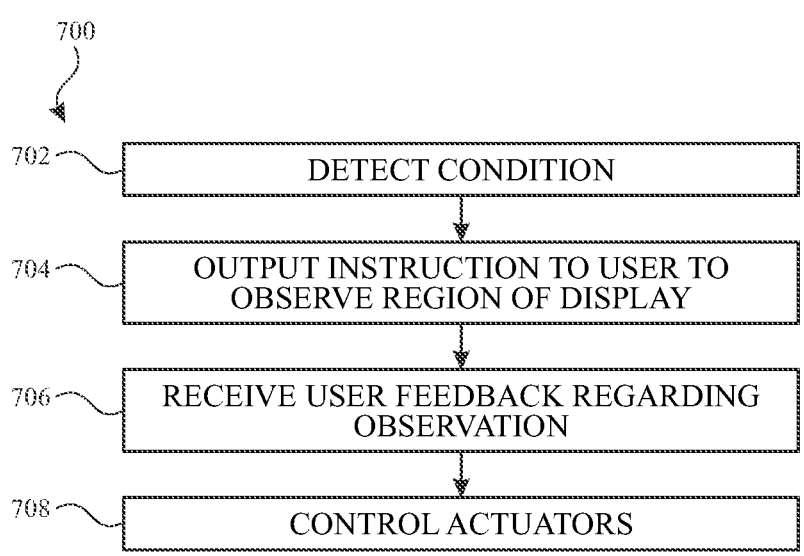
FIG. 7 illustrates a method of operating a head-mountable device to capture particles within an optical module, in accordance with some embodiments of the present disclosure.

Referring now to FIG. 7, another method of operating a head-mountable device is provided to achieve the results described herein. The method 700 can be performed at least in part by a head-mountable device to dislodge particles (e.g., dust) from optical components and retain the particles outside of an optical pathway. Additionally or alternatively, at least some steps can be performed in part by another device operatively connected to the head-mountable device. It will be understood that the method 700 illustrated in FIG.

7 is merely an example, and that a method can be performed with additional steps and/or fewer steps than those illustrated in FIG. 7.

In operation 702, a head-mountable device detects one or more conditions indicating that a particle control step may be appropriate. The condition can be one or more of a variety of conditions. For example, one or more sensors of the head-mountable device can detect a presence of a particle on one or more optical components of the optical module and/or along an optical pathway and can further determine that a cleaning operation is to be performed under such a condition. Such a detection can be subject to verification by the user, as described below.

In operation 704, the head-mountable device outputs instructions to a user to observe a region of the display element that may have a particle. For example, the region can correspond to a region in which a particle is detected in operation 702. Accordingly, the head-mountable device may indication (e.g., visually) the region in which the user is requested to observe. Additionally or alternatively, the user may be provided with no indication, but instead can be instructed to observe a region based on the user's own detection of a potential particle.

In operation 706, the head-mountable device can receive user feedback regarding the requested observation. For example, the one or more sensors can detect the direction of a user's gaze and calculate a corresponding location on the display element and/or other optical element to determine that the user is indicating the location of a particle obstructing a view along the optical pathway. By further example, the user feedback can be received via any input component, including tactile input, motion gesture control, and/or voice command.

In operation 708, the head-mountable device initiates a cleaning procedure (e.g., with a processor) based on the user feedback. For example, the controller of the head-mountable device operates one or more actuators (e.g., module actuator and/or display actuator) to move the optical module and/or the display element to dislodge particles therefrom. Other operations can be similarly performed as described herein to dislodge particles. The particles can be captured (e.g., actively and/or passively) by one or more particle retention elements.

Accordingly, embodiments of the present disclosure provide a head-mountable device with an optical module that removes particles from an optical pathway and captures the particles so they do not interfere with the user's view of and/or through optical elements. For example, the display element and/or another optical element can be moved in a manner that releases particles on a viewing surface thereof. The optical module can include a particle retention element that securely retains the particles so that they remain outside of the optical pathway. The movement of the display element and/or another optical element can be performed periodically, based on user input, based on conditions detected by an internal sensor, and/or based on conditions detected by an external device. The movement of the display element and/or another optical element can be achieved with one or more actuators in one or more of a variety of movement patterns to release the particles. Such particle removal and retention can improve and maintain the quality of a user's visual experience via the optical module.

Various examples of aspects of the disclosure are described below as clauses for convenience. These are provided as examples, and do not limit the subject technology.

Clause A: a head-mountable device comprising: a frame; an optical module comprising: a housing; a display element within the housing; an optical element providing a view to the display element; and a particle retention element within the housing and configured to retain particles upon contact with the particles; and a module actuator configured to vibrate the optical module relative to the frame.

Clause B: a head-mountable device comprising: a pair of optical modules, each of the optical modules comprising: a housing; a display element within the housing; an optical element providing a view to the display element; a particle retention element within the housing and configured to retain particles upon contact with the particles; and a display actuator within the housing and configured to move the display element relative to the housing.

Clause C: a head-mountable device comprising: a frame; an optical module comprising: a housing; a display element within the housing; and an optical element providing a view to the display element along an optical pathway; an actuator configured to move the display element or the optical element relative to the frame; a particle sensor configured to detect a presence of a particle in the optical pathway; and a controller configured to control operation of the actuator based on an indication that the particle sensor has detected the presence of the particle in the optical pathway.

One or more of the above clauses can include one or more of the features described below. It is noted that any of the following clauses may be combined in any combination with each other, and placed into a respective independent clause, e.g., clause A, B, or C.

Clause 1: the optical element is positioned along an optical pathway between the display element and an eye of a user when the head-mountable device is worn by the user, wherein the head-mountable device further comprises: a particle sensor configured to detect a presence of a particle in the optical pathway; and a controller configured to control operation of the module actuator based on an indication that the particle sensor has detected the presence of the particle in the optical pathway.

Clause 2: the particle sensor is positioned within the housing and oriented to capture a view of the display element.

Clause 3: the particle sensor is oriented to capture a view of the optical element.

Clause 4: the particle sensor is oriented to further capture a view of an eye of a user through the optical element when the head-mountable device is worn by the user.

Clause 5: the optical module is a first optical module and the head-mountable device further comprises a second optical module, wherein each of the first optical module and the second optical module are moveable relative to the frame to align with a corresponding one of a user's eyes.

Clause 6: the optical module is positioned on an inner side of the frame, the head-mountable device further comprising a camera module on an outer side of the frame, the camera module being movable with the optical module.

Clause 7: the optical element is positioned along an optical pathway between the display element and an eye of a user when the head-mountable device is worn by the user; and the particle retention element is positioned axially between the display element and the optical element and extends about the optical pathway.

Clause 8: a particle sensor configured to detect a presence of a particle on the display element; and a controller configured to control operation of the display actuator based on an indication that the particle sensor has detected the presence of the particle on the display element.

Clause 9: the display actuator is configured to vibrate the display element relative to the housing.

Clause 10: the controller is further configured to: based on a detection of the presence of a particle in the optical pathway, output an instruction to a user to observe the display element; receive feedback from the user regarding the observation; and control the operation of the actuator further based on the feedback from the user.

Clause 11: the optical module further comprises a particle retention element within the housing and configured to retain particles upon contact with the particles, the particle retention element being positioned axially between the display element and the optical element and extending about the optical pathway.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
  a frame;
  an optical module comprising:
    a housing;
    a display element within the housing;
    an optical element providing a view to the display element; and
    a particle retention element within the housing, comprising an adhesive, and configured to retain particles upon contact with the particles; and
  a particle sensor configured to detect a presence of the particles within the housing; and
  a module actuator configured to vibrate the optical module relative to the frame in response to a detection by the particle sensor of the presence of the particles in the housing.

2. The head-mountable device of claim 1, wherein the particle sensor is configured to detect the presence of the particles in an optical pathway between the display element and an eye of a user when the head-mountable device is worn by the user.

3. The head-mountable device of claim 2, wherein the particle sensor is positioned within the housing and oriented to capture a view of the display element.

4. The head-mountable device of claim 2, wherein the particle sensor is oriented to capture a view of the optical element.

5. The head-mountable device of claim 4, wherein the particle sensor is oriented to further capture a view of the eye of a user through the optical element when the head-mountable device is worn by the user.

6. The head-mountable device of claim 1, wherein the optical module is a first optical module and the head-mountable device further comprises a second optical module, wherein each of the first optical module and the second optical module are moveable relative to the frame to align with a corresponding one of a user's eyes.

7. The head-mountable device of claim 1, wherein the optical module is positioned on an inner side of the frame, the head-mountable device further comprising a camera module on an outer side of the frame, the camera module being movable with the optical module.

8. The head-mountable device of claim 1, wherein:
the optical element is positioned along an optical pathway between the display element and an eye of a user when the head-mountable device is worn by the user; and
the particle retention element is positioned axially between the display element and the optical element and extends about the optical pathway.

9. A head-mountable device comprising:
a pair of optical modules, each of the optical modules comprising:
a housing defining an interior space that is sealed from an external environment;
a display element within the interior space;
an optical element providing a view to the display element;
a particle retention element within the interior space and configured to retain particles upon contact with the particles;
a particle sensor configured to detect a presence of the particles on the display element
a display actuator within the interior space and configured to move the display element relative to the housing; and
a controller configured to control operation of the display actuator in response to a detection by the particle sensor of the presence of the particles on the display element.

10. The head-mountable device of claim 9 wherein the particle sensor is positioned within the housing and oriented to capture a view of the display element.

11. The head-mountable device of claim 9 wherein the particle sensor is positioned outside of the housing and oriented to capture a view of the display element through the optical element.

12. The head-mountable device of claim 9, wherein:
the optical element is positioned along an optical pathway between the display element and an eye of a user when the head-mountable device is worn by the user; and
the particle retention element is positioned axially between the display element and the optical element and extends about the optical pathway.

13. The head-mountable device of claim 9, wherein the display actuator is configured to vibrate the display element relative to the housing.

14. A head-mountable device comprising:
a frame;
an optical module comprising:
a housing;
a display element within the housing; and
an optical element providing a view to the display element along an optical pathway;
an actuator configured to move the display element or the optical element relative to the frame;
a particle sensor configured to detect a presence of a particle in the optical pathway; and
a controller configured to control operation of the actuator based on an indication that the particle sensor has detected the presence of the particle in the optical pathway.

15. The head-mountable device of claim 14, wherein the particle sensor is positioned within the housing and oriented to capture a view of the display element.

16. The head-mountable device of claim 14, wherein the particle sensor is oriented to capture a view of the optical element.

17. The head-mountable device of claim 16, wherein the particle sensor is oriented to further capture a view of an eye of a user through the optical element when the head-mountable device is worn by the user.

18. The head-mountable device of claim 14, wherein the controller is further configured to:
based on a detection of the presence of a particle in the optical pathway, output an instruction to a user to observe the display element;
receive feedback from the user regarding the observation; and
control the operation of the actuator further based on the feedback from the user.

19. The head-mountable device of claim 14, wherein the optical module further comprises a particle retention element within the housing and configured to retain particles upon contact with the particles, the particle retention element being positioned axially between the display element and the optical element and extending about the optical pathway.

* * * * *